Dec. 19, 1939.     E. H. GROSS     2,184,216

OLIVE UTENSIL

Filed May 31, 1939

Inventor
Edward H. Gross
By Francis H. Templeton
Attorney

Patented Dec. 19, 1939

2,184,216

UNITED STATES PATENT OFFICE 2,184,216

OLIVE UTENSIL

Edward Henry Gross, Kenmare, N. Dak.

Application May 31, 1939, Serial No. 276,705

1 Claim. (Cl. 30—137)

This invention relates generally to olive utensils intended to be used for removing olives from bottles. My invention more particularly relates to the provision of an olive utensil, both simple in construction and efficient in operation, which is adapted to be inserted into a bottle for ready engagement with, and removal of, an olive therefrom, regardless of number of olives therein.

Various other objects and advantages of this invention will be obvious from the following particular description of an embodiment of my invention.

The various features of novelty which characterize my invention are pointed out with particularity in the claim, annexed to and forming a part of this specification, but for a better understanding of the invention, however, its advantages and specific objects attained with its use, reference should be had to the accompanying drawing and descriptive matter in which I have illustrated and described the best form of my invention.

Figure 1:
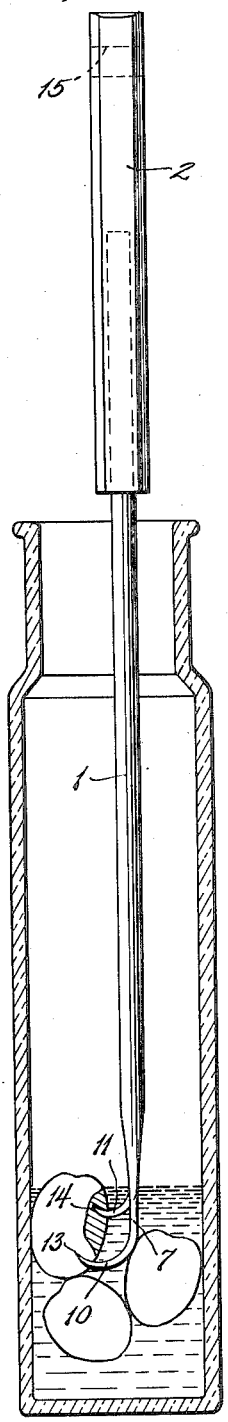
Fig. 1 is a side view of an olive utensil embodying my invention inserted into a bottle and in engagement with an olive therein.

Referring to the drawing, my olive utensil comprises a shank 1 having one end secured to a handle 2, and having its opposite end formed with a plurality of hooks or claws. These hooks or claws, three in number, include two longer claws 3 and 4, and a shorter claw 5. The claws 3, 4 and 5 have arm portions 6, 7 and 8, respectively, bent to form curved hook portions 9, 10 and 11, respectively, which have pointed ends 12, 13 and 14, respectively.

As shown in the drawing, all three claws have their arm portions lying in the same plane, and have their hook portions projecting in the same direction and substantially at right angles to such plane. However, claw 5 has both its arm portion and its hook portion shorter than the arm portion and hook portion, respectively, of each of claws 3 and 4, so that the claw 5 is shorter than, and spaced above, the claws 3 and 4, in the position indicated in Fig. 2. Also it will be noted that shorter claw 5 lies between longer claws 3 and 4, which latter two diverge outwardly from each other.

Preferably the shank and claws are made of stainless steel and the handle of genuine catalin, but any other suitable materials may be used therefor. Near its upper end the handle is provided with a hole 15 to permit hanging the utensil in convenient position.

In the drawing, I have illustrated one way of using my invention for removing an olive floating in liquid contained in a bottle. Thus, in Fig. 1, my olive utensil is shown inserted in a bottle near the bottom of which are left a few olives, with one of those olives held adjacent the inside wall of the bottle by pressing the two long claws on either side of the olive below its center (as indicated in Fig. 2) while forcing the shorter claw into the olive to thereby permit the latter to be readily withdrawn from the bottle.

Although shown in connection with olives, it will be understood that my utensil is adapted for use also with cucumber pickles, for example, and also with various other pickles, as well as with different vegetables, fish, meats and other foodstuffs.

It is obvious that the three claws, in the particular relation shown, provide my utensil with three points of support for any article engaged therewith, and this is true whether all three claws are impaled in the article or only one of them is impaled and the other two claws engage the outside surface of such article, as shown in the drawing, so as to make for ease and efficiency in taking from a jar, for example, any size olive, small or large, and also any pickle, irrespective of size, such as cucumber, dill, beet, apple, peach, etc.

Figure 2:
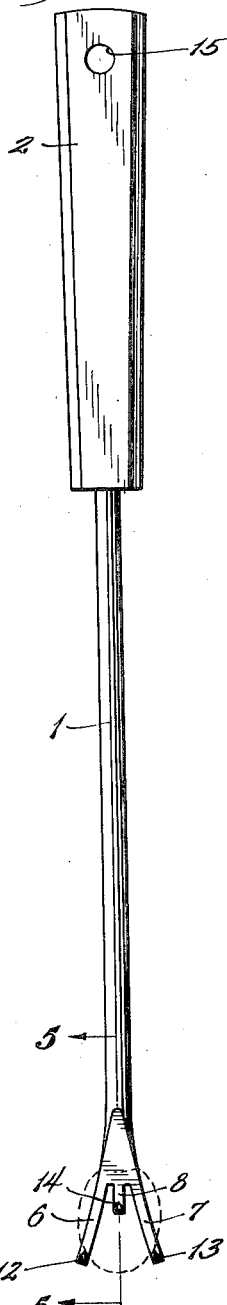
Fig. 2 is a front face view of my olive utensil holding an olive.
Figure 3:
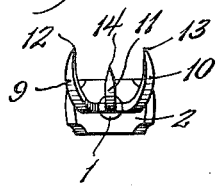
Fig. 3 is an end view of my olive utensil.
Figure 4:
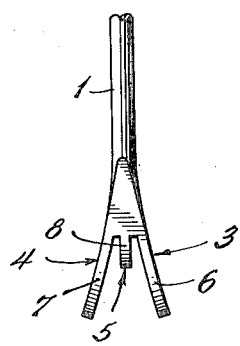
Fig. 4 is a rear face view of the claw end of my olive utensil.
Figure 5:
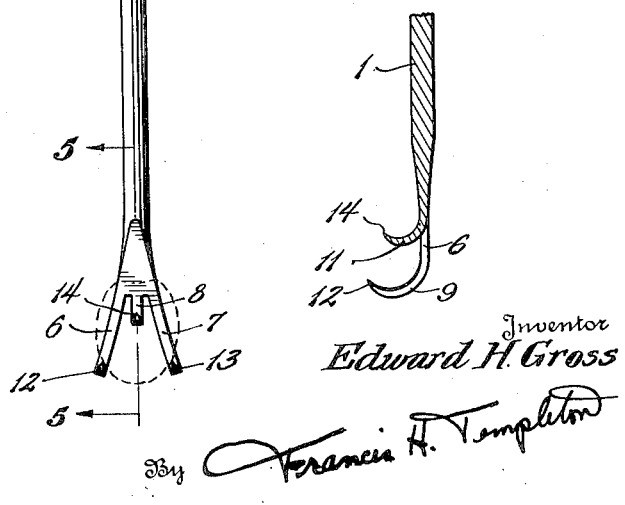
Fig. 5 is a cross-sectional view on the line 5—5 of Fig. 2.

As shown each of the three claws is curved longitudinally, with its inner face concave and with its point extending slightly upwardly, so that in the position shown in Fig. 1, the shorter upper claw is impaled in an olive, with its point 14 extending slightly upwardly, hooklike, and thus the olive is insured against dropping off during removal from the bottle, not only by reason of the smaller claw being impaled in the olive with the two longer claws cooperating to provide the three-point support, but also because of the curved shape of such impaling claw permitting its point to act "hooklike" in holding the olive thereon.

While in accordance with the provisions of the statutes I have illustrated and described the best embodiment of my invention now known to me, it will be apparent to those skilled in the art that changes may be made in the subject matter and form of the invention disclosed without departing from the spirit of my invention as set forth in the appended claim, and that in some cases certain features of my invention may be used to advantage without a corresponding use of other features.

I claim:

An olive utensil comprising a shank portion, claws formed at one end thereof and integral therewith, said claws including two longer claws and a shorter claw, each of such claws having an arm portion and a hook portion, the arm portions of said longer claws extending substantially equal distances from said shank portion and diverging outwardly from each other, the arm portion of said shorter claw lying between, and extending a shorter distance than, said arm portions of such longer claws, the arm portions of said three claws lying in substantially the same plane and the hook portions of said three claws extending at substantially right angles to such plane, the hook portions of said longer claws being longer than the hook portion of said shorter claw, whereby three points of support are provided for an olive by the hooks of the two longer claws adapted to engage on either side of the olive below its center and by the hook of the shorter claw adapted to impale an olive thereon.

EDWARD HENRY GROSS.